Aug. 19, 1947.    S. F. HARDMAN    2,426,093
STAGE LIGHTING
Filed May 2, 1945    2 Sheets-Sheet 1
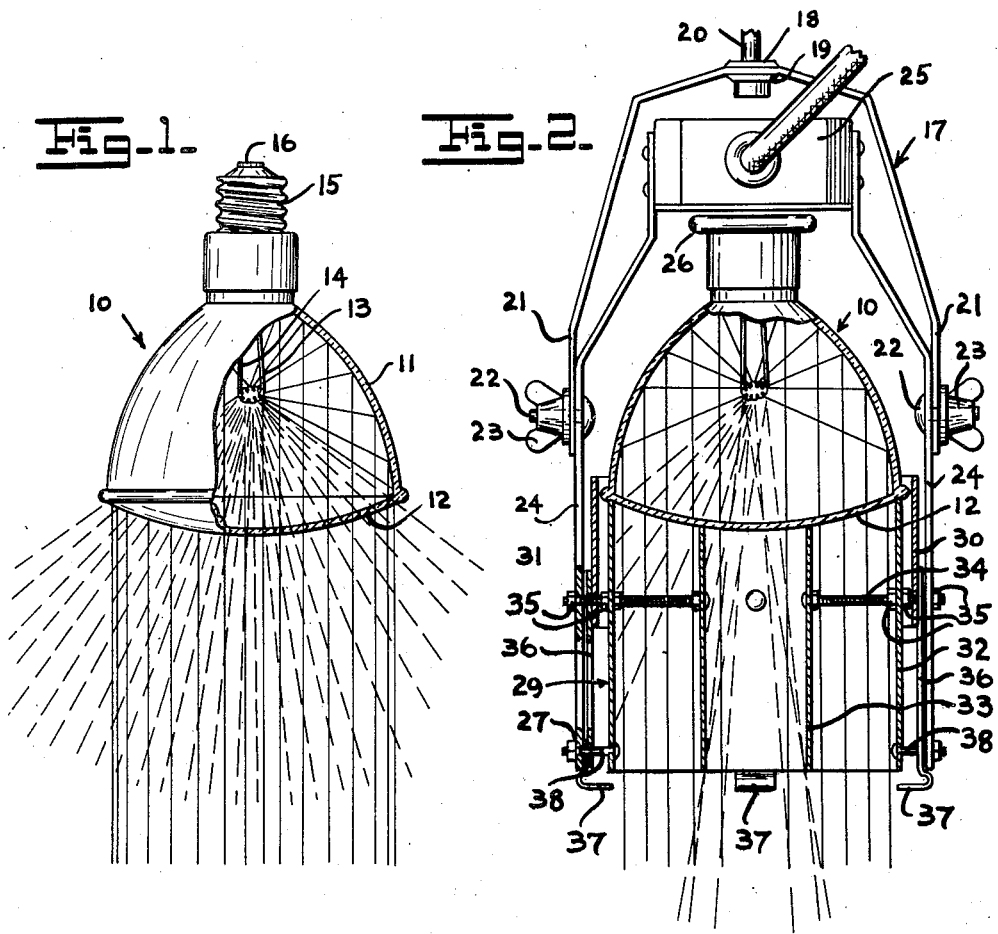
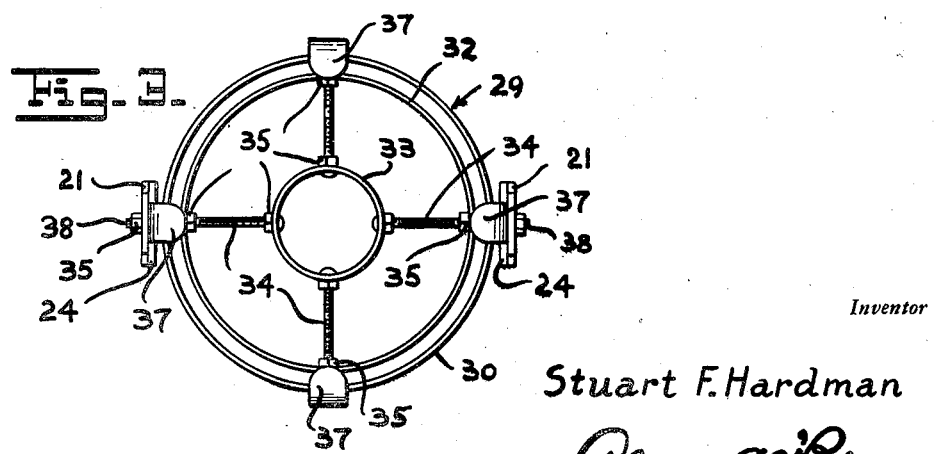
Inventor
Stuart F. Hardman

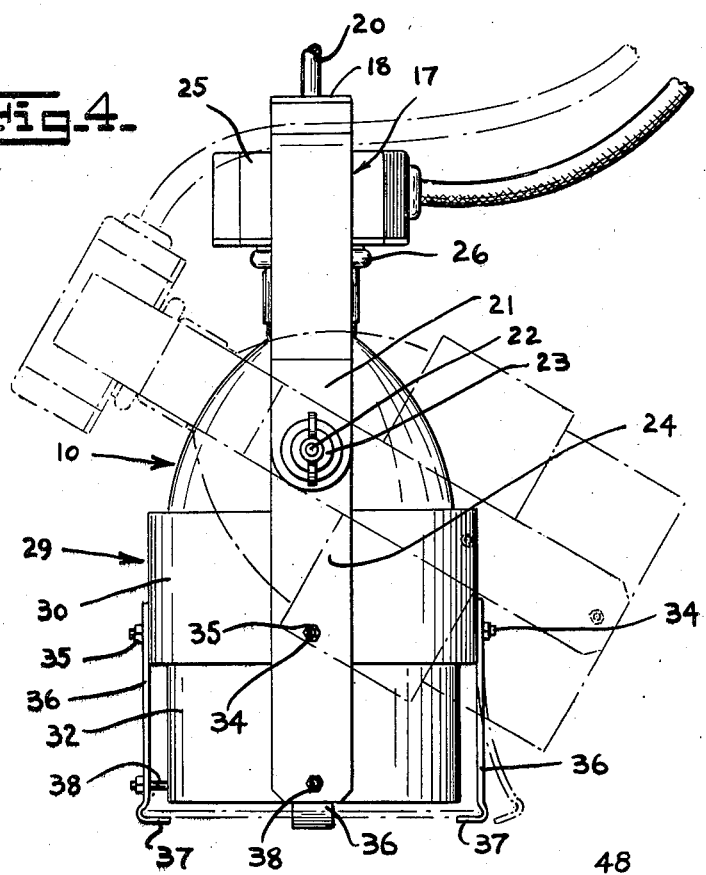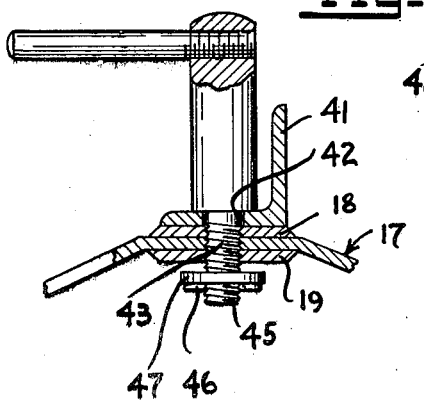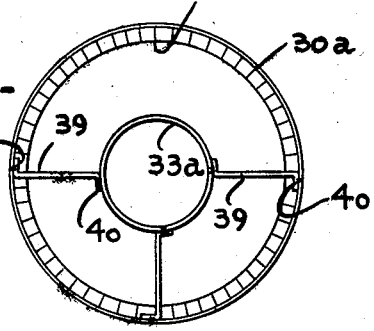

Patented Aug. 19, 1947

2,426,093

UNITED STATES PATENT OFFICE 2,426,093

STAGE LIGHTING

Stuart F. Hardman, Mendon, Utah

Application May 2, 1945, Serial No. 591,450

2 Claims. (Cl. 240—3.1)

This invention relates to stage lighting and more particularly to an adaptor by which a projector spot light of the "Sealed beam" type can be rendered suitable for stage lighting.

It is a matter of common knowledge that projector spot lights now in common use while producing a light beam of high intensity serving admirably as a spot light, also produce a fringe of spilled light of a wide angle which not only serves no useful purpose but also in certain instances is definitely undesirable.

The primary object of this invention is to shield the spilled light and prevent its escape from the light source at undesirable angles.

Another object is to render the ordinary "Sealed beam" type of spot light useful for stage lighting purposes.

The above and other objects may be attained by employing this invention which embodies, among its features, a light shield in the form of concentric louvres adapted to fit the front or outer face of the cover glass of a "Sealed beam" spotlight, an annular shield encircling the junction of the outermost louvre and the cover glass to prevent the escape of spilled light at this point and means to sustain the louvres and shield in proper relation to the spot light irrespective of the direction which the light beam may be aimed.

Other features include a suspension yoke by which the "Sealed beam" spotlight and the louvres may be supported in various adjusted positions and means for removably supporting a color filter in the light beam produced by the assembly.

In the drawings—

Figure 1 is a side view partly in section of a "Sealed beam" spot projector showing the light distribution normally produced thereby.

Figure 2 is a side view partly in section of my improved adaptor showing it applied to a spot projector of the type illustrated in Figure 1.

Figure 3 is a bottom plan view of Figure 2.

Figure 4 is a side view in elevation of Figure 2, illustrating in dotted lines the projector and louvres tilted toward the horizontal.

Figure 5 is a fragmentary view partly in section of one manner of suspending my device from a horizontal support and, Figure 6 is a bottom plan view of a modified form of louvre construction.

Referring to the drawings in detail a projector spot light of the "Sealed beam" type designated generally 10 comprises the usual reflector 11 of generally parabolic contour and a non-refracting cover glass 12 sealed to the forward or larger end of the reflector to form an evacuated chamber in which a filament 13 is supported on leads 14 at the focal point of the reflector. These leads 14 extend through the back wall of the reflector 11 and are connected to the usual threaded metal shell 15 and contact member 16 serving to make up the screw threaded lamp base by which lamp bulbs are commonly secured in their sockets. As will be readily appreciated upon referring to Figure 1 the energy radiating from the filament 13 which is intercepted by the reflector 11 is redirected through the cover glass 12 in the form of a parallel bundle of rays of high intensity as indicated by the solid lines in Figures 1 and 2. This forms a powerful spot light which finds wide application for stage lighting. Besides the bundle of parallel rays emanating from such a projector spot light, however, there is also produced direct radiation from the filament 13 which passes directly through the cover glass 12 in the form of a wide angle cone, illustrated by the dotted lines in Figures 1 and 2, which serves no useful purpose.

My invention illustrated in Figures 2 to 4 inclusive includes a supporting yoke designated generally 17 which comprises a strip of material, such as strap iron, bent in the form of an inverted U having at the center of its bight portion a pair of reinforcing pads 18 and 19, it being understood that the strip and the pads are formed with aligning openings to receive the shank of a suspension hook or bolt 20. Near the free ends of the legs 21 of the U-shaped strip are aligning openings for the reception of bolts 22 having wing nuts 23 threaded thereon, the use of which will be more fully hereinafter described.

Mounted for pivotal movement about the bolts 22 is a pair of parallel arms 24 carrying at their upper ends an outlet box 25 in which a lamp socket 26 is supported in position to receive the base of the lamp 10 with its cover glass 12 lying between the arms 24 slightly beyond the pivot bolts 22. Each arm 24 is formed near its free end with an opening 27 and intermediate the opening 27 and the opening through which its pivot bolt 22 extends with an opening 28. The purpose of these openings 27 and 28 will be more fully hereinafter explained.

A light shielding and louvre structure designated generally 29 comprises an annular shield 30 of a diameter somewhat greater than the largest diameter of the projector spot light 10. This shield 30 is pierced at diametrically opposed points near its lower end with openings 31 which are adapted to align with similar openings formed in an outer louvre 32 intermediate its ends. The outer louvre 32 is of a diameter substantially equal to the diameter of the outer convex face of the cover glass 12 of the lamp 10 and the diametrically opposed openings are so located intermediate the ends of the outer louvre that when they align with the openings 31 the upper end of the louvre fits snugly against the cover glass 12 as shown in Figure 2. Concentrically arranged with relation to the outer louvre 32 and the annular shield 30 is an inner louvre 33 which like the louvre 32 is pierced with diametrically opposed openings which when they align with the openings 31 bring the upper end of the inner louvre 33 snugly into contact with the cover glass 12. The diametrically opposed openings in the shield and in each louvre are 90° apart and extending through said openings are radially arranged bolts 34 which are threaded throughout their lengths to accommodate clamping nuts 35. As shown in Fig. 2 these bolts are of such length that two of them will project through the openings formed in the arms 24 intermediate the openings 27 and the openings through which the bolts 22 extend.

Suspended from the bolts 35 and extending downwardly therefrom to a point slightly below the lower ends of the louvres 32 and 33 are color filter supporting-brackets 36 having in-turned ears 37 at their lower ends upon which the frame of a color filter is supported so as to interpose the color filter in the path of the light beam. As shown in Figures 2 and 4 two of these brackets are connected by bolts 38 to the lower ends of the arms 24, it being understood that they project through the openings 27 formed therein.

In the modified form of construction shown in Figure 6 the outer and inner louvres 30a and 33a respectively corresponding to the outer and inner louvres 30 and 33 are connected together and held in concentric relation by radial vanes 39 the flanges 40 of which are spot welded to their respective louvres.

In the modified form of suspension illustrated in Figure 5 a horizontal support 41, such as an angle iron, is pierced as at 42 to receive the threaded shank 43 of a bolt 44 and the opening 45 through the yoke 17 and the reinforcing pads 18 and 19 is internally screw threaded to receive the shank 43. It will thus be seen that the bolt may be tightened to cause the yoke to be drawn up against the under side of the support 41 to hold the device firmly in the desired position. In order to avoid danger of the lamp falling through withdrawal of the bolt from the opening 45, the shank 43 is pierced near its lower end to receive a cotter pin 46 upon which a washer 37 is supported. Hence any possibility of the bolt being turned clear out of the threaded opening 45 is avoided.

In operation it will be seen that any stray or spilled light emanating from the projector spot light 10 will be intercepted by the louvres 32 and 33 and the shield 30 so that nothing but the spot beam is visible. Color filters may be readily inserted and removed by springing one of the brackets 36 outwardly as shown in dotted lines and the projector may be used at any desired angle by swinging it about the pivot bolts 22 and locking it in the desired position by tightening the thumb nuts 23.

It is to be understood that if so desired the free end of the outer louvre 30 or 30a may be provided with an inturned flange 48 (Fig. 6) to provide a sharp cut off of any spilled light from the lamp 10.

While in the foregoing there has been shown and described the preferred embodiment of this invention it is to be understood that minor changes in the details of construction, combination and arrangement of parts may be resorted to without departing from the spirit and scope of the invention as claimed.

What I claim is:

1. An adapter for rendering a projector spot light suitable for use as a stage spot light comprising an annular shield encircling the junction of the cover glass and reflector of a projector spot lamp, concentric louvres carried by the shield for interrupting spilled light from the lamp, an outlet box having a socket for receiving the base of the lamp and means carried by the outlet box for supporting the shield and louvres in proper position with relation to the lamp.

2. An adapter for rendering a projector spot light suitable for use as a stage spot light comprising an annular shield encircling the junction of the cover glass and reflector of a projector spot lamp, concentric louvres carried by the shield for interrupting spilled light from the lamp, an outlet box having a socket for receiving the base of the lamp, means carried by the outlet box for supporting the shield and louvres in proper position with relation to the lamp, and means to removably support a color filter at the ends of the louvres in the path of the light beam.

STUART F. HARDMAN.

REFERENCES CITED

The following references are of record in the file of this patent:

UNITED STATES PATENTS

| Number | Name | Date |
|---|---|---|
| 2,262,629 | Wright | Nov. 11, 1941 |

FOREIGN PATENTS

| Number | Country | Date |
|---|---|---|
| 341,492 | Great Britain | Jan. 12, 1931 |
| 737,765 | France | Oct. 10, 1932 |